Patented Aug. 24, 1926.

1,596,983

UNITED STATES PATENT OFFICE.

JAMES H. MACKINTOSH, OF JERSEY CITY, NEW JERSEY.

PROCESS FOR PRESERVING AND DRYING YEAST.

No Drawing.    Application filed December 5, 1923. Serial No. 678,785.

My invention relates to the art of drying yeast and has special reference to the preparation of foods therefrom.

One object of my invention is to provide a method for easily and economically producing a dried yeast food by combining yeast with molasses or sugar solutions.

Another object of my invention is to utilize waste yeast which is unsuitable for human consumption by combining it with molasses to produce a food for cattle or poultry which is palatable and at the same time high in vitamine content.

It is a well known fact that when substances readily soluble in water are added to yeast, from which water has been removed as thoroughly as practicable by mechanical means, "solution" of the yeast is apparently brought about due to the flow of water through the walls of the yeast cells. This property of compressed yeast to liquefy is taken advantage of in the present invention.

According to my invention, I mix compressed yeast with sugar or sugar solutions, molasses being preferred because of its low cost. The yeast will immediately liquefy and this liquid is then heated in shallow vessels in an oven from 60° to 100° C. Fermentation soon sets in causing the mass to rise considerably in the vessel. Large volumes of fermentation gases, saturated with water, are given off so that drying of the material is quickly effected, the mass usually remaining in its raised condition when dry. The resultant product is a porous, crisp material not unlike dried bread in texture and may either be pulverized or left in the form in which dried. Furthermore, it is non-hygroscopic and will not decompose or mould even in a hot, humid climate. The material has an agreeable odor and is quite palatable to humans as well as animals.

Other methods for drying the yeast mixture may be used such as the air spraying method or drying upon steam heated pans under which circumstances the physical condition only of the product would vary from that described. The method of drying indicated is given merely by way of illustration.

Although varying proportions of sugar or molasses may be used, I have found the following to be quite satisfactory and to produce a material similar to that described above: 100 parts compressed yeast, 5 to 10 parts molasses containing about 50% sugar.

If the yeast mixture is dried at the lower temperatures of the range recited, a large part of the yeast cells retain their vitality. On account of this fact, the resultant product may be used as a source of yeast for baking purposes. However, if it is desired to use the dried yeast merely for its vitamine content, the higher temperatures of the range may be employed at which most, if not all, of the yeast cells are killed and the vitamines unaffected.

When the dried product is to be employed as a cattle or poultry food, waste yeast which is unsuitable for human consumption may be used. Also, various grain products may be incorporated to give bulk or add nutritive value to the food.

Various modifications may be made in the details of my process without departing from the spirit of my invention, the scope of which is defined by the annexed claims.

What I claim is:—

1. The process for preparing a dried yeast product which consists in mixing compressed yeast with a sugar containing material, heating the mixture whereby fermentation is quickly set up causing rapid drying of the product due to the escape of fermentation gases.

2. The process for preparing a dried yeast product which consists in mixing compressed yeast with a sugar containing material and heating the mixture to a temperature above 60° C. but below the temperature at which the vitamine content is killed, whereby rapid elimination of the moisture is promoted by the escape of generated gases.

3. The process for preparing a dried yeast product which consists in mixing compressed yeast with molasses, heating the mixture whereby fermentation is quickly set up causing rapid drying of the product due to the escape of fermentation gases.

4. The process for preparing a dried yeast product which comprises mixing compressed yeast with molasses, heating the mixture to a temperature above 60° C. but below the temperature at which the vitamin content is killed, whereby fermentation is quickly set up causing rapid drying of the product due to the escape of fermentation gases.

In testimony whereof I affix my signature.

JAMES H. MACKINTOSH.